(12) United States Patent
Mansour

(10) Patent No.: US 12,396,049 B2
(45) Date of Patent: Aug. 19, 2025

(54) LAYERED WIRELESS NETWORKS

(71) Applicant: T-Mobile Innovations LLC, Overland Park, KS (US)

(72) Inventor: Nagi A. Mansour, Arlington, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 389 days.

(21) Appl. No.: 17/879,298

(22) Filed: Aug. 2, 2022

(65) Prior Publication Data

US 2024/0049323 A1 Feb. 8, 2024

(51) Int. Cl.
*H04W 76/16* (2018.01)
*H04L 5/00* (2006.01)

(52) U.S. Cl.
CPC ........... *H04W 76/16* (2018.02); *H04L 5/0016* (2013.01)

(58) Field of Classification Search
CPC .............................. H04L 5/0016; H04W 76/16
See application file for complete search history.

(56) References Cited

U.S. PATENT DOCUMENTS

| | | | | |
|---|---|---|---|---|
| 2018/0049213 A1* | 2/2018 | Gholmieh | ............ | H04L 41/0226 |
| 2020/0196371 A1* | 6/2020 | Lei | ........... | H04W 24/02 |
| 2021/0084524 A1* | 3/2021 | Foti | ............ | H04W 80/00 |
| 2021/0391943 A1* | 12/2021 | Djordjevic | ............ | H04L 1/203 |
| 2022/0030488 A1* | 1/2022 | Han | ............ | H04L 5/0035 |
| 2022/0109622 A1* | 4/2022 | Yeh | ............ | H04L 69/40 |
| 2022/0124043 A1* | 4/2022 | Zhu | ............ | H04L 47/2475 |
| 2022/0124588 A1* | 4/2022 | Zhu | ............ | H04W 28/0236 |
| 2022/0216938 A1* | 7/2022 | Pezeshki | ............ | H04L 5/0051 |
| 2022/0295525 A1* | 9/2022 | Yamamoto | ............ | H04L 5/0026 |

FOREIGN PATENT DOCUMENTS

CN 113490239 B * 7/2023

* cited by examiner

*Primary Examiner* — Shah M Rahman
(74) *Attorney, Agent, or Firm* — Shook, Hardy & Bacon L.L.P.

(57) ABSTRACT

Computerized systems, computer readable media and methods are provided for initiating an action for simultaneously establishing multiple 4G and/or 5G data links between a node and a single user device. Multiple 4G and/or 5G communication layers are simultaneously generating in a telecommunications network. Separate domain code channels are developed for each of the 4G and/or 5G communication layers. Multiple 4G and/or 5G data links are established for each communication layer using a separate domain code channel between a node and a single user telecommunications device.

17 Claims, 5 Drawing Sheets

LAYERED WIRELESS NETWORKS

BACKGROUND

The fifth-generation technology standard for broadband cellular networks (5G) is the successor to the fourth-generation technology standard (4G). Telecommunication industry standards define "5G" as a system using 5G new radio software. 4G and 5G networks are cellular networks that divide a network into small geographical areas called cells. 4G and 5G enable wireless devices to communicate with a base station using radio waves over frequency channels assigned by the base station.

In 4G, the frequency bandwidth is 15 KHz. In 5G, an increase in data throughput is achieved by increasing the frequency bandwidth from 15 KHz to 30 and 60 kHzT. The increased data throughput in 5G improves the quality of the Internet for mobile users and allows 5G networks to act as Internet Service Providers (ISPs) for laptop and desktop computers.

BRIEF DESCRIPTION OF THE DRAWINGS

Illustrative embodiments of the present invention are described in detail below with reference to the attached drawing figures, and wherein.

SUMMARY

Computerized systems, computer readable media, and methods are provided for initiating an action for simultaneously establishing multiple 4G and/or 5G data links between a node and a single user device. Multiple 4G and/or 5G communication layers are simultaneously generating in a telecommunications network. Separate domain code channels are developed for each of the 4G and/or 5G communication layers. Multiple 4G and/or 5G data links are established for each layer using a separate domain code channel between a node and a single user telecommunications device.

One or more non-transitory computer storage media having computer-executable instructions embodied thereon that, when executed, perform a method for simultaneously generating a first 4G and/or 5G communication layer and a second 4G and/or 5G communication layer are provided. A first domain code channel for the first 4G and/or 5G communication layer and a second domain code channel for the second 4G and/or 5G communication layer are developed. An action is initiated for simultaneously establishing a first 4G and/or 5G data link on the first domain code channel and a second 4G and/or 5G data link on the second domain code channel between a telecommunication node and a single user device.

A computer system comprising a node having one or more processors and a single user telecommunication device is provided. The processor simultaneously generates multiple 4G and/or 5G communication layers in a telecommunications network. Separate domain code channels for each of the 4G and/or 5G communication layers are developed. An action is initiated for simultaneously establishing multiple 4G and/or 5G network connections with each using a separate domain code channel between the node and the single user telecommunications device.

DETAILED DESCRIPTION

The subject matter of the present invention is being described with specificity herein to meet statutory requirements. However, the description itself is not intended to limit the scope of this patent. Rather, the inventors have contemplated that the claimed subject matter might also be embodied in other ways, to include different operators or combinations of operators similar to the ones described in this document, in conjunction with other present or future technologies. Terms should not be interpreted as implying any particular order among or between various operators herein disclosed unless and except when the order of individual operators is explicitly described. As such, although the terms "operator" and/or "block" can be used herein to connote different elements of system and/or methods, the terms should not be interpreted as implying any particular order and/or dependencies among or between various components and/or operators herein disclosed unless and except when the order of individual operators is explicitly described. The present disclosure will now be described more fully herein with reference to the accompanying drawings, which may not be drawn to scale and which are not to be construed as limiting. Indeed, the present invention can be embodied in many different forms and should not be construed as limited to the aspects set forth herein. Further, it will be apparent from this Detailed Description the technological solutions disclosed herein are only a portion of those provided by the present invention. As such, the technological problems, solutions, advances, and improvements expressly referenced and explained herein should not be construed in a way that would limit the benefits, improvements, and/or practical application of the discussed aspects of the present invention.

As one skilled in the art will appreciate, embodiments of the invention may be embodied as, among other things, a method, system, or set of instructions embodied on one or more computer readable media. Accordingly, the embodiments may take the form of a hardware embodiment, a software embodiment, or an embodiment combining software and hardware. In one embodiment, the invention takes the form of a computer-program product that includes computer-usable instructions embodied on one or more computer-readable media, as discussed further with respect to FIG. 2.

Embodiments herein provide a technological solution that addresses, solves, and overcomes the technological problems and/or shortcomings found in telecommunications systems for increasing bandwidth and data throughput. 4G and 5G have significantly increased the bandwidth and data throughput of telecommunications network in recent years. 4G and 5G networks are cellular networks that divide a network into small geographical areas called cells. 4G and 5G enabled wireless devices communicate with a base station using radio waves over frequency channels assigned by the base station.

4G networks, such as LTE, transmit signals that are used for mobile telecommunication. To facilitate data transmission by radio, LTE transmissions use an orthogonal frequency-division multiplexing (OFDM) digital modulation scheme to modulate the frequency and time domains of radio communication. LTE transmissions are organized into radio frames of 10 milliseconds each. Each frame is divided into ten equally sized subframes.

5G also uses OFDM and retains the concept of 10 millisecond frames from LTE, DL, and UL. However, in 5G, the frame is extended in the frequency and time domains as compared to LTE. In 5G, the number of slots per subframe may vary and the time domain may be extended. 5G frame structures provide a fixed overall structure for defining data block transmission timing. An increase in data throughput in 5G is also achieved by increasing the frequency for frequency range 1 (FR1) from 15 kHz to 30 and 60 kHz and for frequency range 2 (FR2) increasing the frequency to 60, 120, 240 kHz and 480 MHz for mmWave.

In addition to frequency and time domains, radio communications may also use a channel access method to distribute signal power across a set of code domain channels. Code-division multiple access (CDMA) is an example of a channel access method used by various radio communication technologies. CDMA is an example of multiple access, where several transmitters are able to send information simultaneously over a single communication channel. This allows several users to share a band of frequencies. To permit this without undue interference between the users, CDMA employs spread spectrum technology and a special domain coding scheme where each transmitter is assigned a code.

Previous technology has not contemplated using the frequency and time domains of 4G and 5G with a method, such as CDMA, to distribute signal power across a set of code domain channels. Embodiments of this disclosure describe simultaneously generating multiple 4G and/or 5G layers with extended frequency and time domains to develop multiple separate code domain channels for each of the multiple 4G and/or 5G layers. In doing so, the separate domain channels allow for multiple separate 4G and/or 5G network connections to be established between a node and a single user telecommunications device. Using separate code domain channels, such as those described in CDMA, for multiple layers of 4G and/or 5G increases bandwidth, data throughput, and optimizes downlink and uplink speed.

Embodiments described herein describe extending multiple layers of 4G and/or 5G in code domain channels resulting in doubling/tripling data throughput. The combination of multiple layers of 4G and/or 5G using multiple code domain channels results in what some may describe as the sixth generation of wireless or 6G. Although described as being applicable to 4G and 5G, it will be appreciated the channel concept can be applied to successors of 4G and 5G with extended frequency and time radio domains. Embodiments of this disclosure describe methods and systems for simultaneously establishing multiple 4G and/or 5G network connections, each using a code separate channel between a node and a single user telecommunications device in a telecommunications network as described with respect to FIG. 1.

Figure 1:
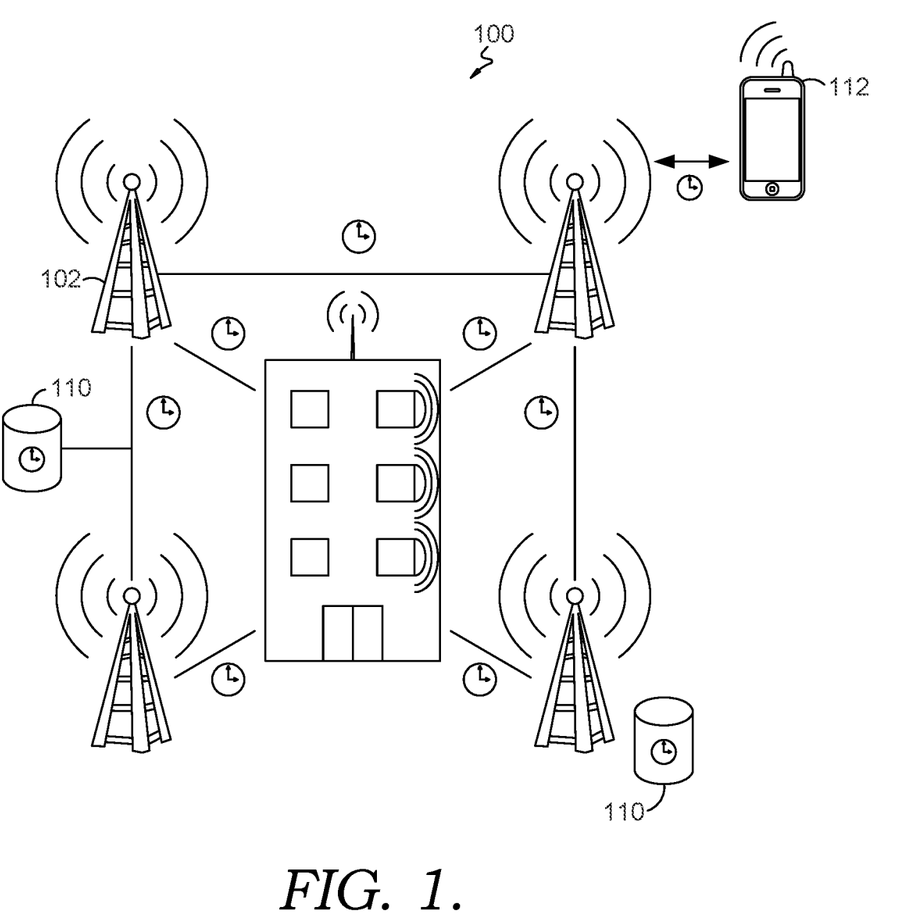
FIG. 1 depicts an exemplary mobile telecommunications network suitable for use in implementing aspects herein.

With reference to FIG. 1, an example is depicted illustrating aspects described herein implemented in a communication network 100. Generally, communication network 100 comprises base station(s) 102, database(s) 110, and user device 112. It will be understood by those skilled in the art that a communication network, such as communication network 100, may include an array of devices or components, some of which are not shown so as to not obscure more relevant aspects of the invention. Components such as terminals, links, and nodes (as well as other components) may provide connectivity in some embodiments. In aspects, network 100 is associated with one or more communications provider(s) that provides services to user devices, such as user device 112. For example, network 100 may provide voice and/or data services to user devices or corresponding users that are registered or subscribed to utilize the services provided by a communications provider. Network 100 can be any communication network providing voice and/or data service(s), such as, for example, a 1× circuit voice; a 3G network (e.g., CDMA, CDMA2000, WCDMA, GSM, UMTS); a 4G network (WiMAX, LTE, HSDPA); a 5G network; a 6G network; or the like.

Database 110 may be any type of medium capable of storing information. In some aspects, database 110 comprises at least one instance of a database that is part of a distributed database, such as database 110.

In aspects, base station 102 is a wireless communications station installed at a fixed location, such as a communication tower, as illustrated in FIG. 1. The communication tower may be a structure designed to support one or more antennas for communications and/or broadcasting. In other embodiments, base station 102 is a mobile base station, small cell, mini cell, micro cell, pico cell, and/or a femto cell. The base station 102 may be an eNode B in an LTE telecommunications network and may be used to communicate as part of the wireless communications network. In this way, base station 102 can facilitate wireless communications between user device 112 and other devices, user devices, the Internet, and/or network 100. The base station 102 may include at least one baseband unit (BBU) responsible for, among other things, digital baseband signal processing. For instance, CDMA/EVDO and LTE Internet protocol (IP) packets are received from a wireless communications network and are digitally combined by the BBU at the base station 102. The blended digital baseband signal is transmitted to a radio at the base station 102. Digital baseband signals received from the radio are demodulated by the BBU and the resulting IP packets are transmitted by the BBU to the network. The base station 102 may include a radio (not shown) or a remote radio head (RRH) that generally communicates with one or more antennas associated with the base station 102. The base station may support multiple-input-multiple-output (MIMO) and/or time division duplex or any other suitable communication protocols. In some aspects, base station includes a database 110. In some aspects, base station 102 includes a base station clock (device clock) that facilitates time division duplex, MIMO, and/or other communication protocols supported by base station 102 between the base station and one or more user devices, such as user device 112.

User device 112 can communicate with other devices, such as mobile devices, servers, etc. The user device 112 can take on a variety of forms, such as a personal computer; a laptop computer; a tablet; a netbook; a mobile phone; a smart phone; a personal digital assistant; or any other device capable of communicating with other devices by way of a network. Makers of illustrated user devices include, for example, Research in Motion; Creative Technologies Corp.; Samsung; Apple computers; Nokia, Motorola; and the like. A user device 112 may comprise, for example, a display(s); a power source(s) (e.g., a battery); a data store(s); a speaker(s); memory; a buffer(s); and the like. In embodiments, user device 112 comprises a wireless or mobile device with which a wireless telecommunications network(s) can be utilized for communication, e.g., voice and/or data communication. In this regard, the user device 112 can be any mobile computing device that communicates by way of, for example, a 3G, 4G, or 5G network. User device 112 may connect, at least temporarily, to base station 102.

Figure 2:
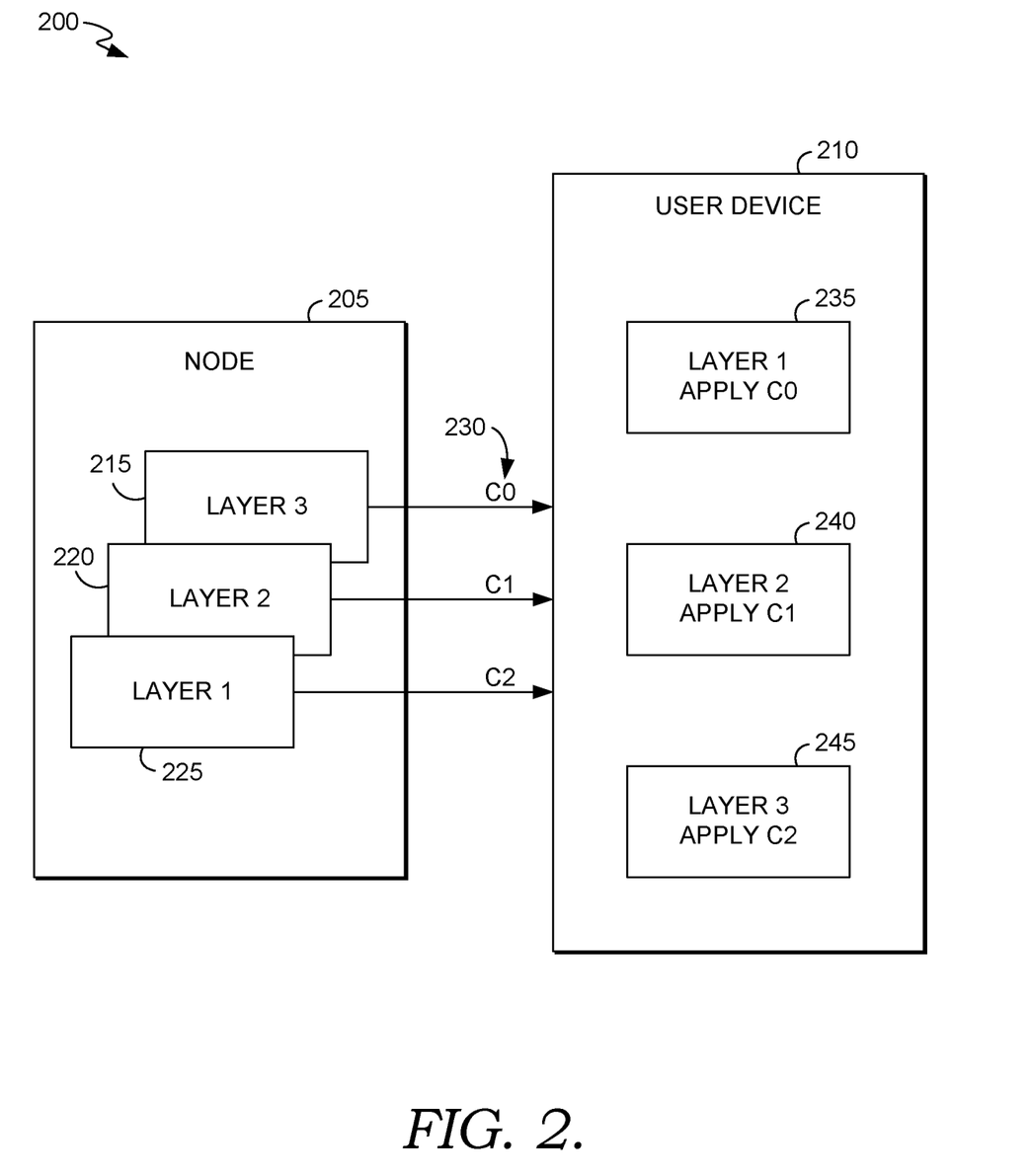
FIG. 2 depicts a layered telecommunications network suitable for use in implementing aspects herein.

Turning to FIG. 2, an exemplary computing system 200 is depicted. The computing system 200 (hereinafter "system") is merely an example of one suitable computing system and is not intended to suggest any limitation as to the scope of use or functionality of embodiments of the present invention. Neither should the system 200 be interpreted as having any dependency or requirement related to any single module or combination of modules illustrated herein.

In some embodiments, one or more of the illustrated modules may be implemented as a stand-alone application. The modules described are exemplary in nature and in number and should not be construed as limiting. Any number of components may be employed to achieve the desired functionality within the scope of the embodiments hereof. Further, modules may be located on any number of servers.

In the embodiment shown in FIG. 2, the system 200 includes a one or more nodes 205 and a single user telecommunications device 210. In implementations, an exemplary node is an eNode B. A user device 210 may include a personal computer; a laptop computer; a tablet; a netbook; a mobile phone; a smart phone; a personal digital assistant; or any other device capable of communicating with other devices by way of a network.

Node 205 generates multiple layers of 4G and/or 5G. The layers may include data to be communicated by radio from node 205 to user device 210. The layers may be subdivided into frames to define a fixed overall structure for defining data block transmission timing. In the example of FIG. 2, a node 205 generates multiple 4G and/or 5G layers, such as layer 1 (225), layer 2 (220), and layer 3 (215). As described above, 4G and 5G networks have extended frequency and time domains.

Although depicted as three layers in FIG. 2, node 205 may generate any number of 4G and/or 5G layers. The 4G and/or 5G layers are simultaneously generated for establishing a connection with a single user device 210. Furthermore, it is within the scope of this disclosure that node 205 may generate both 4G and 5G layers simultaneously. Each layer is separate and can stand by itself. Each of layers 1-3 contains different data for transmission and is completely independent of the other layers. Each layer is associated with one different domain code and channel.

Node 205 generates a separate domain code channel for each of layer 1 (225), layer 2 (220), and layer 3 (215). As can be seen in the example of FIG. 2, domain code channel C0 is generated for layer 3 (215), domain code channel C1 is generated for layer 2 (220), and a domain code channel C2 is generated for layer 1 (225).

Node 205 uses a channel access method to distribute signal power across a set of code domain channels. Code-division multiple access (CDMA) is an example of a channel access method used by various radio communication technologies. CDMA uses spread spectrum technology to transmit data. Historically, CDMA permitted several mobile devices to send and receive through a single channel.

To generate, CDMA uses a series of orthogonal codes, such as Walsh codes. These codes correspond to lines of a special square matrix called the Hadamard matrix. For a set of Walsh codes of length N, it consists of n lines to form a square matrix of n×n Walsh code.

The IS-95 system uses 64 Walsh function matrix 64. The first line of this matrix contains a string of all zeros with each of the following lines containing different combinations of bit 0 and 1. Each line is orthogonal and equal representation for binary bits. When implemented with the CDMA system, each mobile user uses one of the 64 sequences of rows in the matrix as a spreading code. Additionally, it provides zero cross-correlation among all the other users. This matrix is defined recursively as follows.

$$W_1 = [0] \quad W_{2*} = \begin{bmatrix} W_* & W_* \\ W_* & W_* \end{bmatrix}$$

In the above equation, n is a power of 2 and indicates the different dimensions of the matrix W. Further, n represents the logic NOT operation on all bits in this matrix. The three matrices W2, W4, and W8, respectively show the Walsh function for the dimension 2, 4, and 8.

$$W_2 = \begin{bmatrix} 0 & 0 \\ 0 & 1 \end{bmatrix} \quad W_4 = \begin{bmatrix} 0 & 0 & 0 & 0 \\ 0 & 1 & 0 & 1 \\ 0 & 0 & 1 & 1 \\ 0 & 1 & 1 & 0 \end{bmatrix} \quad W_8 = \begin{bmatrix} 0 & 0 & 0 & 0 & 0 & 0 & 0 & 0 \\ 0 & 1 & 0 & 1 & 0 & 1 & 0 & 1 \\ 0 & 0 & 1 & 1 & 0 & 0 & 1 & 1 \\ 0 & 1 & 1 & 0 & 0 & 1 & 1 & 0 \\ 0 & 0 & 0 & 0 & 1 & 1 & 1 & 1 \\ 0 & 1 & 0 & 1 & 1 & 0 & 1 & 0 \\ 0 & 0 & 1 & 1 & 1 & 1 & 0 & 0 \\ 0 & 1 & 1 & 0 & 1 & 0 & 0 & 1 \end{bmatrix}$$

Each line of the 64 Walsh matrix 64 corresponds to a channel number. The channel number 0 is mapped to the first row of the Walsh matrix, which is the code of all zeros. This channel is also known as the pilot channel and is used to form and to estimate the impulse response of a mobile radio channel.

In the example of FIG. 2, the Walsh codes have poor cross-correlation properties and good autocorrelation properties. The Walsh codes in this example are used to develop the individual channels for each 4G and/or 5G layer. The Walsh codes of FIG. 2 (C0, C1 and C2) are used to identify the data for each individual 4G and/or 5G layer transmission.

Once the data from the 4G and/or 5G layers is transmitted via domain code channels from node 205 to user device 210, user device is programed to apply to the appropriate Walsh code to the data received via a domain code channel. For example, user device 210 is programmed to apply domain code C0 for data for layer 3 (245), domain code C1 for data for layer 2 (240), and a domain code C2 for data for layer 1 (235).

The user device 210 may then apply the correct domain code to each channel and a data link is established between the user device 215 and node 205. The domain code channel with 4G and/or 5G data is opened and an action simultaneously establishing multiple 4G and/or 5G network connections each using a separate domain code channel between the node and the single user telecommunications device 210. The multiple separate data links 230 allow 4G and/or 5G data to flow between the node 205 and user device 210. This can double or triple the data throughput between node 205 and user device 210.

Figure 3:
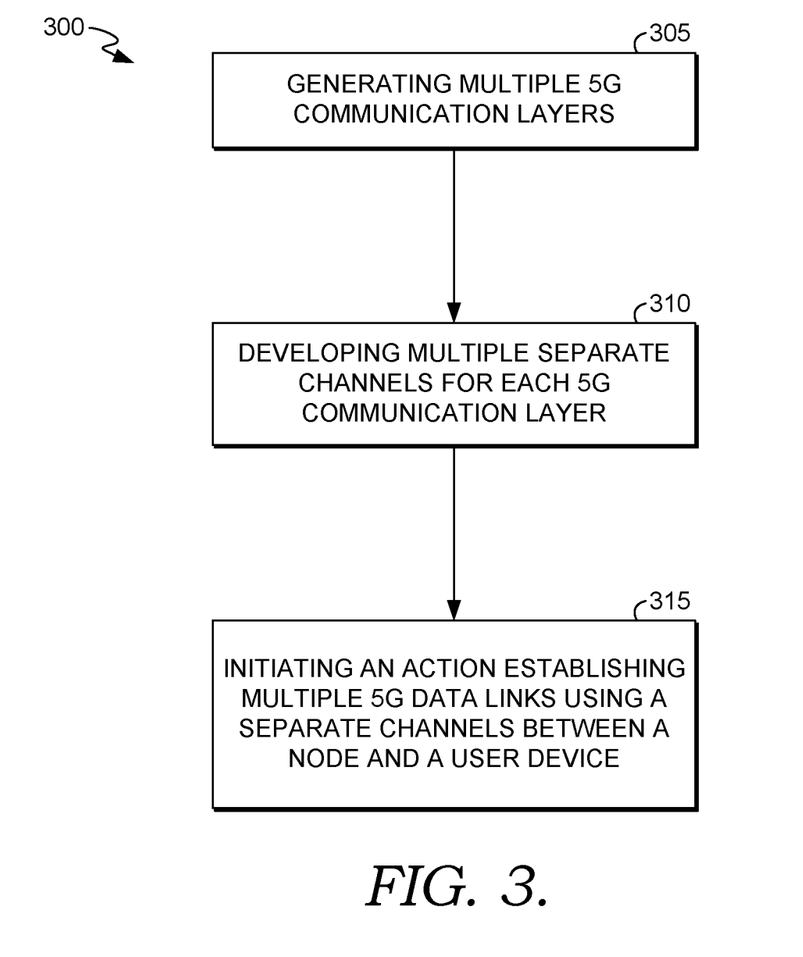
FIG. 3 depicts an exemplary method for establishing multiple 4G and/or 5G data links between a node and a user device, according to an aspect herein.

Turning now to FIG. 3, a method 300 for initiating an action establishing multiple 5G data links between a node and a single user device is provided. At 305, data for multiple 4G and/or 5G communication layers is generated. For example, a node may generate multiple 4G and/or 5G communication layers for communicating with a single user device. At 310, a node generates different and separate channels for each of the multiple 4G and/or 5G communication layers. An action is initiated at 315, establishing a data link between the node and single user communication device. As described above, the single user device is programmed to multiply the channel by a domain code. This establishes a multiple but separate data link between a node and a single user device thereby significantly increasing the data throughput.

Figure 4:
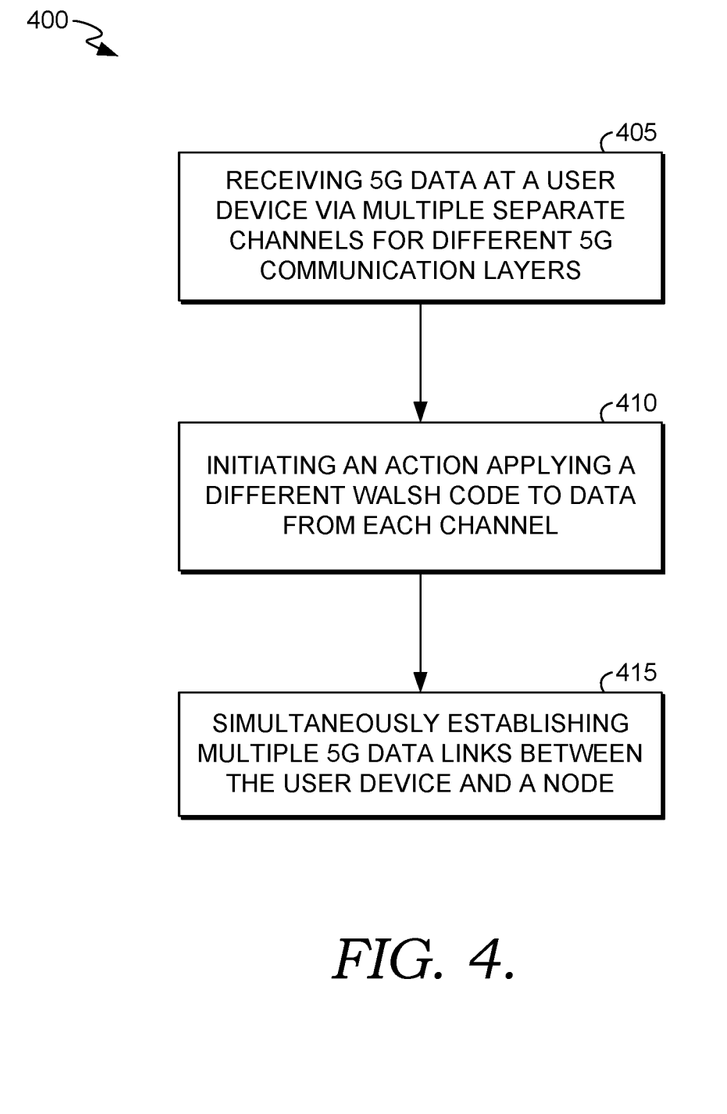
FIG. 4 depicts simultaneously establishing multiple 4G and/or 5G data links between a user device and a node, according to an aspect herein.

Referring next to FIG. 4, a method 400 for simultaneously establishing multiple 4G and/or 5G data links between a node and a single user device. Multiple channels are established between a node and a user device. Data is received by the user device. An action is initiated at 410 when user device applies the corresponding Walsh code to data from each channel. After the user device applies the corresponding Walsh code to the channel, at 415 a data link is established between the user device and node with increased data throughput.

Figure 5:
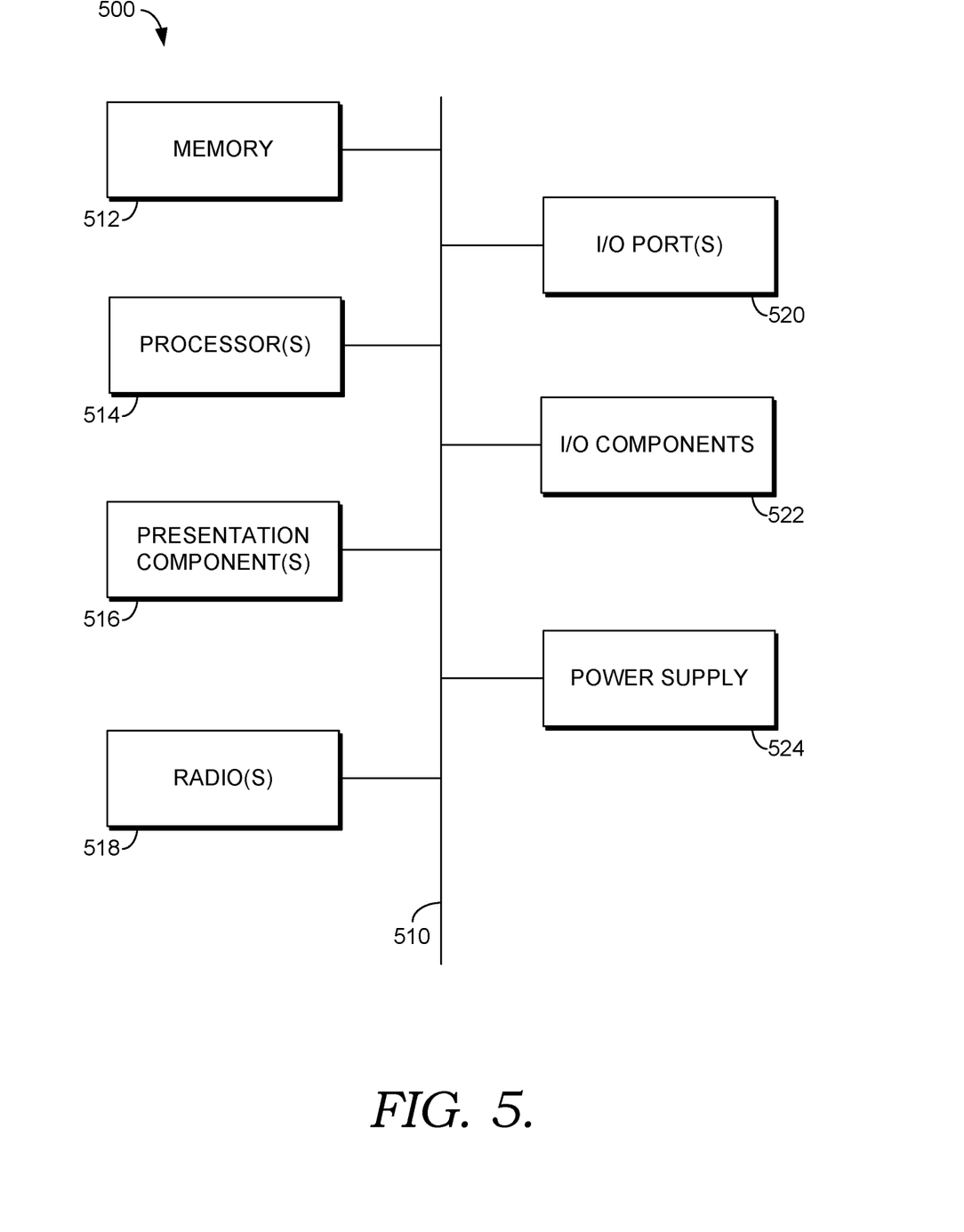
FIG. 5 depicts an exemplary computing device suitable for use in implementing aspects herein.

In FIG. 5, computing device 510 can directly or indirectly couple to the following devices: memory 512; one or more processors 514; one or more presentation components 516; input/output ports 520; input/output components 522; illustrative power supply 524; and one or more radio sources or aspects 518. The various blocks of FIG. 5 are shown with lines for the sake of conceptual clarity, and other arrangements of the described components and/or component functionality are contemplated. For example, processors have memory. The diagram of FIG. 5 is merely illustrative of an example computing device that can be used in connection with one or more embodiments of the present invention.

Computing device 510 typically includes a variety of computer-readable media. Computer-readable media can be any available media that can be accessed by computing device 510 and includes both volatile and nonvolatile, removable and non-removable media. By way of example, and not limitation, computer-readable media may comprise computer storage media and communication media. Computer storage media excludes signals, per se. Computer storage media include volatile and nonvolatile, removable and non-removable media implemented in any method or technology for storage of information, such as computer-readable instructions, data structures, program modules, or other data. Computer storage media includes, but is not limited to, RAM; ROM; EEPROM; flash memory or other memory technology; CD-ROM; digital versatile disks (DVD); other optical disk storage, magnetic cassettes, magnetic tape, magnetic disk storage or other magnetic storage devices; or any other medium which can be used to store the desired information and which can be accessed by computing device.

Memory 512 includes computer storage media in the form of volatile and/or nonvolatile memory. The memory may be removable, non-removable, or a combination thereof. Exemplary hardware devices include solid-state memory, hard drives, optical-disc drives, etc. Computing device 510 includes one or more processors that read data from various entities, such as memory 512 or I/O components 522. Presentation component(s) 516 present data indications to a user or other device. Exemplary presentation components include a display device, speaker, printing component, vibrating component, etc. I/O ports 520 allow computing device 510 to be logically coupled to other devices, including I/O components 522, some of which may be built in. Illustrative components include a microphone, joystick, game pad, satellite dish, scanner, printer, wireless device, etc.

With reference to the technical solution environment described herein, embodiments described herein support the technical solution described herein. The components of the technical solution environment can be integrated components that include a hardware architecture and a software framework that support constraint computing and/or constraint querying functionality within a technical solution system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low-level functions relating, for example, to logic, control, and memory operations. Low-level software written in machine code can provide more complex functionality to higher levels of software. As used herein, computer-executable instructions includes any software, including low level software written in machine code; higher level software, such as application software; and any combination thereof. In this regard, the system components can manage resources and provide services for system functionality. Any other variations and combinations thereof are contemplated with embodiments of the present invention.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A computer system comprising:
one or more processors;
non-transitory computer readable media storing computer executable instructions that when executed by the one or more processors perform a method including:
simultaneously generating multiple 4G and/or 5G communication layers in a telecommunications network, wherein each of the multiple 4G and/or 5G communication layers is an independent transmission layer;
developing a separate domain code channel for each of the 4G and/or 5G communication layers; and
initiating an action simultaneously establishing multiple 4G and/or 5G network connections each using the separate domain code channel between a node and a single user telecommunications device, wherein each network connection is assigned to a distinct domain code channel based on separate Walsh code and carries separate, non-overlapping data.

2. The system of claim 1, wherein each separate domain code channel is assigned a unique Walsh code from a Hadamard matrix, and wherein the action initiated is multiplying each layer by the Walsh code to create an independent, orthogonal domain code channel.

3. The system of claim 2, wherein the separate Walsh codes enable each 4G and/or 5G communication layer to maintain an independent, non-overlapping network connection with the user device without inter-channel interference.

4. The system of claim 1, wherein each of the multiple 4G and/or 5G communication layers transmits distinct data packets that are not shared with the other of the multiple 4G and/or 5G communication layers, and wherein each layer maintains an independent connection to the user device via the separate Walsh-coded domain channel.

5. The system of claim 4, wherein there are three or more 4G and/or 5G communication layers and three or more separate domain code channels for each 4G and/or 5G communication layer.

6. One or more non-transitory computer storage media having computer-executable instructions embodied thereon that, when executed, perform a method for:
   simultaneously generating a first 4G and/or 5G communication layer and a second 4G and/or 5G communication layer, wherein each layer is assigned a distinct domain code channel based on a separate Walsh code;
   developing a first domain code channel for the first 4G and/or 5G communication layer and a second domain code channel for the second 4G and/or 5G communication layer, wherein the domain code channels are orthogonal to one another; and
   initiating an action for simultaneously establishing a first 4G and/or 5G data link on the first domain code channel and a second 4G and/or 5G data link on the second domain code channel between a telecommunication node and a single user device.

7. The method of claim 6, wherein the action initiated is multiplying the first 4G and/or 5G communication layer by a first domain code and multiplying the second 4G and/or 5G communication layer by a second domain code.

8. The method of claim 7, wherein the first and second domain codes are orthogonal codes of CDMA applications.

9. The method of claim 6, wherein each of the first 4G and/or 5G communication layers transmits distinct, non-overlapping data that is assigned to the separate Walsh-coded domain channel, wherein each communication layer maintains an independent, orthogonal network connection with the user device.

10. The method of claim 9, wherein the first 4G and/or 5G communication layer comprises a first frame and the second 4G and/or 5G communication layer comprises a second frame, wherein the first and second frame contain different data and are executed simultaneously via the data link.

11. A computer system comprising:
   a node having one or more processors;
   a single user telecommunication device;
   non-transitory computer readable media storing computer executable instructions that when executed by the one or more processors perform a method including:
   simultaneously generating multiple 4G and/or 5G communication layers in a telecommunications network, wherein each of the multiple 4G and/or 5G communication layers is assigned a distinct Walsh-coded domain channel;
   developing a separate domain code channel for each of the 4G and/or 5G communication layers, wherein each domain code channel carries independent data and is transmitted using a unique orthogonal Walsh code; and
   initiating an action simultaneously establishing multiple 4G and/or 5G network connections, wherein each network connection is maintained independently between the node and the single user telecommunications device via the separate Walsh-coded domain channel.

12. The system of claim 11, wherein the action initiated is multiplying each layer by the separate domain code.

13. The system of claim 12, wherein the separate domain codes are orthogonal codes of CDMA applications.

14. The system of claim 11, wherein each of the multiple 4G and/or 5G communication layers has distinct data that is not shared with the other of the multiple 4G and/or 5G communication layers.

15. The system of claim 14, wherein there are three or more 4G and/or 5G communication layers and three or more separate domain code channels for each 4G and/or 5G communication layer.

16. The system of claim 11, wherein the multiple 4G and/or 5G network connections are independent data links that are established and maintained in parallel, each mapped to the separate Walsh-coded domain channel to prevent inter-channel interference.

17. The system of claim 16, wherein the multiple 4G and/or 5G communication layers comprise frames, wherein the frames contain different data and are executed simultaneously via the data link.

\* \* \* \* \*